US006477251B1

(12) United States Patent
Szrek et al.

(10) Patent No.: US 6,477,251 B1
(45) Date of Patent: Nov. 5, 2002

(54) APPARATUS AND METHOD FOR SECURELY DETERMINING AN OUTCOME FROM MULTIPLE RANDOM EVENT GENERATORS

(75) Inventors: Walter Szrek, Warsaw (PL); Robert C. Angell, Jr., W. Greenwick; Scott Tillotson, North Kingston, both of RI (US)

(73) Assignee: Gtech Rhode Island Corporation, West Greenwich, RI (US)

( * ) Notice: Subject to any disclaimer, the term of this patent is extended or adjusted under 35 U.S.C. 154(b) by 0 days.

(21) Appl. No.: 09/200,682

(22) Filed: Nov. 25, 1998

(51) Int. Cl.[7] .............................. H04L 9/16; H04L 9/24

(52) U.S. Cl. ............................ 380/46; 380/47; 713/171

(58) Field of Search ................................ 713/171, 176, 713/194; 380/46, 47, 251; 708/250

(56) References Cited

U.S. PATENT DOCUMENTS 4,891,775 A 1/1990 McWherter ............ 364/705.06
5,188,363 A 2/1993 Marnell, II et al. ........... 273/85
5,507,489 A 4/1996 Reibel et al. ............... 273/138
5,564,701 A 10/1996 Dettor ......................... 463/16
5,624,119 A 4/1997 Leake ........................ 273/269
5,643,086 A 7/1997 Alcorn et al. ................. 463/29
6,018,581 A * 1/2000 Shona et al. .................. 380/46
6,151,676 A * 11/2000 Cuccia et al. ............... 713/176
6,192,385 B1 * 2/2001 Shimada ..................... 708/250

FOREIGN PATENT DOCUMENTS

EP 0829834 A2 3/1998
EP 0855685 A2 7/1998

OTHER PUBLICATIONS

PCT International Search Report (mailed Mar. 29, 2000).

* cited by examiner

*Primary Examiner*—Gilberto Barron
*Assistant Examiner*—Justin T. Darrow
(74) *Attorney, Agent, or Firm*—Kenyon & Kenyon

(57) ABSTRACT

An apparatus includes a first processor, a second processor and a communications path therebetween. The first processor has a random event generator for generating the first event of a multiple-part event and the second processor has a random event generator for generating the second event of the multiple-part event. The first processor sends the generated first event to the second processor via the communications path and the second processor uses the first event and the second event to form an outcome. In other embodiments, a third processor may be used and positioned between the first and second processor so that there is a communications path between the first processor and the third processor and a communications path between the second processor and the third processor.

30 Claims, 4 Drawing Sheets

APPARATUS AND METHOD FOR SECURELY DETERMINING AN OUTCOME FROM MULTIPLE RANDOM EVENT GENERATORS

TECHNICAL FIELD OF THE INVENTION

The present invention relates to random event generators and more specifically to secure determination of an outcome using random event generators.

BACKGROUND OF THE INVENTION

Casinos have long been filled with electromechanical or stepper motor controlled devices commonly referred to as slot machines. A wide variety of these types of machines exist, some with three reels and some with four or five. These mechanical devices are fast becoming replaced by video based computer controlled machines which simulate the spinning reels. Other types of video-based computer controlled machines are also available these other machines allowing players to play poker, blackjack, keno and other varieties of games.

All of these game machines utilize a variety of techniques to prevent fraud and prediction of results. Security techniques employed include proprietary software for generation of random numbers, physical protection via locks and alarms, and post outcome verification.

Generally on these machines and games, determination of the game's outcome is resolved either within the gaming machine or within a host system communicating with the gaming machine. Within each of these places, the win may be determined using a wide variety of techniques. The most prevalent way to determine game outcome is for a random number mechanism/device in the machine to select elements of the outcome and these elements are then evaluated by standard rules to determine the result. An example would be on a poker game, the random number generator would select five cards randomly from a deck of 52. The five cards are then compared against a win table to determine the prize.

An alternative method to determine the result is to randomly select an element from a list of possible outcomes. Some of the outcomes are wins; some are losses. For those outcomes that are wins, the magnitude of the win is determined within that same selection. An example would be to select one outcome randomly from a set of outcomes. The set of outcomes could include 100 losses, 1 top prize win, 5 second prize wins, 10 third prize wins and 100 fourth prize wins.

Random number generation methods are conventionally based on a single source of random number generation for outcome of a particular draw event. Methods and security of random number generation are typically focused on steps to ensure the algorithm for random generation is derived from a purely random probability event, typically a secure, single point source random number generator.

A risk with a single source of generation is that random outcome can be compromised by tampering with the generation algorithm. Thus, having a single random event generator provides a single point of access to alter the random process algorithm and presents a security risk. A skilled programmer having gained access to a machine may defraud the institution operating the machine by providing ways to either predict the outcome of the machine or make a specific outcome arise at desirable times.

SUMMARY OF THE INVENTION

The invention provides, in preferred embodiments, an apparatus and a method for the secure generation of a random outcome. The apparatus, in one embodiment of the invention, may be used in conjunction with a payout gaming machine for the gaming industry. In another embodiment, the apparatus includes a first processor, a second processor and a communications path therebetween. The first processor has a random event generator for generating a first event of a multiple-part event and the second processor has a random event generator for generating a second event of the multiple-part event. The first processor sends the generated first event to the second processor via the communications path and the second processor uses the first event and the second event to form an outcome. The first processor may be located inside a first housing and the second processor may be located inside a second housing.

In yet another embodiment, the first processor may create a log of all first events generated and store the log in a first processor storage medium and the second processor may create a log of all second events generated and store the log in a second processor storage medium. In other embodiments, the first random event generator and the second random event generator may generate first events and second events at periodic times or random periods. In another embodiment, the first and second random event generators attach identification data to the first event and the second event. The identification data may include time of generation of the event and a digital signature of the processor generating the event. In still another embodiment, the first processor has means for encrypting the first event before sending the first event to the second processor and the second processor has the key for decrypting the first event.

In an alternative embodiment in accordance with the invention, the apparatus may include a third processor, where there is a communications path between the first processor and the third processor and a communications path between the third processor and the second processor. The third processor receives the first event from the first processor and the second event from the second processor and an outcome is determined by the first and second events. In various embodiments, the outcome may be determined on the first processor, the second processor, the third processor or on both the first and second processors.

In another embodiment, the first processor encrypts the first event needing a first decryption key for decryption and the second processor encrypts the second event needing a second decryption key for decryption. The third processor has the first key and the second key and may decrypt the first event and the second event prior to using the first event and the second event to form an outcome.

In other embodiments, the third processor may be located in the first housing or the second housing or in another location. The apparatus may also be configured so that the first processor is not in direct communication with the second processor. The third processor may create a log of received first and second events and store the log in a third processor storage medium.

In yet another embodiment, the second processor has means for encrypting the second event needing a second decryption key for decryption and the first processor has the second decryption key and means for decrypting the second event before using the first event and the second event to form an outcome. In another embodiment, the third processor combines the encrypted first event with the encrypted second event forming a combination event and encrypts the combination event needing a third key for decryption forming an encrypted combination event. The encrypted combination event is sent to the first processor which stores the information in the first processor storage medium.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

The term "processor" as used herein may refer to a computer processor, microprocessor or any other computing device that may be used for determining a random event and processing information related to the random event.

Figure 1:
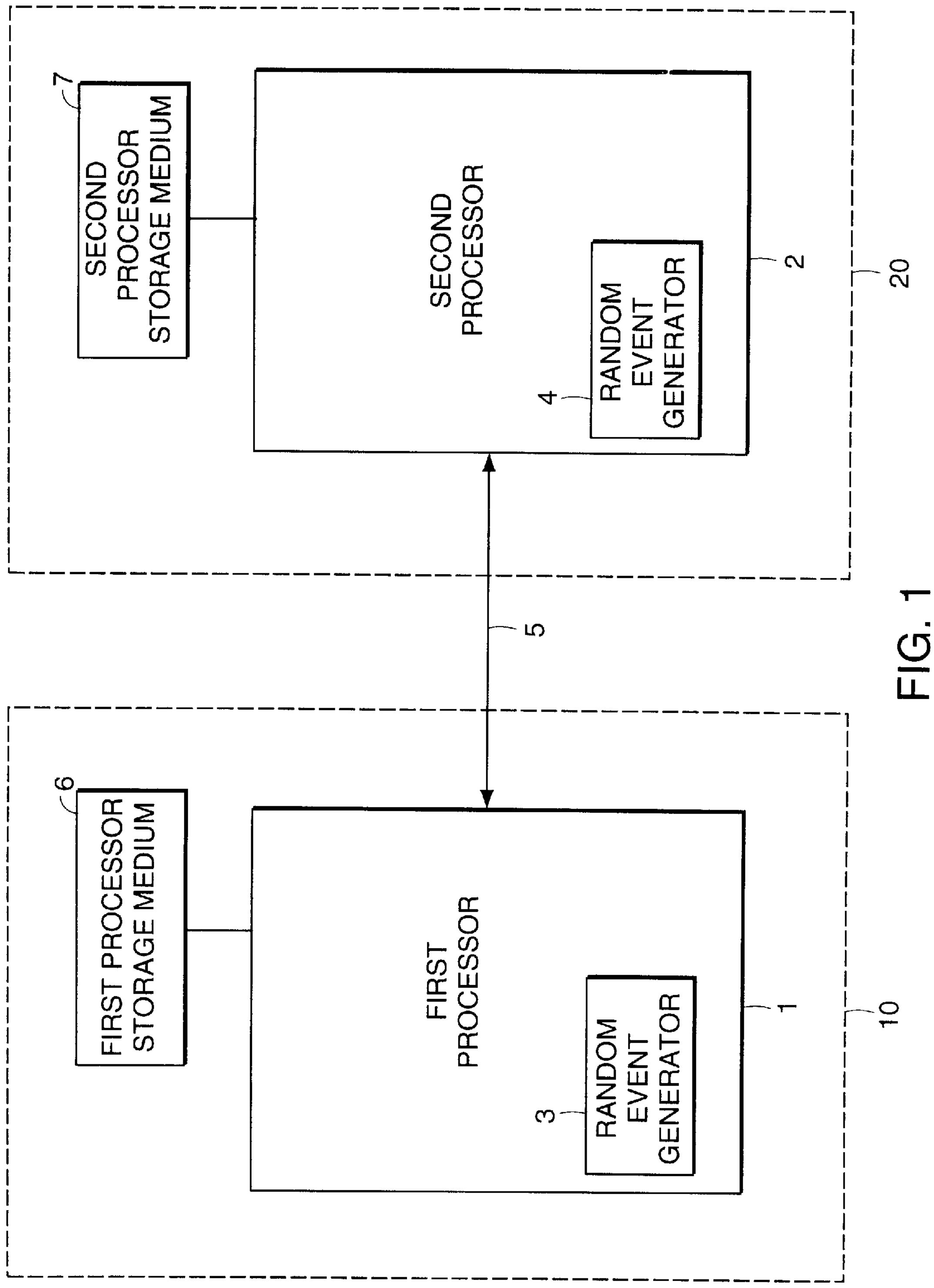
FIG. 1 is block diagram of an apparatus in accordance with one embodiment of the invention for determining a secure outcome.

FIG. 1 shows a block diagram of a system for securely calculating an outcome based on at least two random events in accordance with one embodiment of the invention. This system utilizes a technique of generating random events on two or more separate processors which may be combined to form an output. Each of the processors generate one part that is needed to determine the actual outcome. Since the processors are separate and independent, it is difficult to have sufficient access to compromise the security of the outcome. The system may be particularly implemented on payout gaming machines.

A processor 1 containing a first random event generator 3 is located at a first location 10. A first event of a multi-part event is generated by the first random event generator 3 and this information is passed across a two-way data link 5 to a second processor 2 located at a second location 20. The second processor 2 has a second random event generator 4 which generates a second event of the multi-part event. There may be more than two events which make up the multi-part event; however, for illustrative purposes the discussion within this disclosure will be confined to two events. Upon receipt of the first event, and upon formulation of the second event, the second processor 2 may calculate an outcome based on the first event and the second event. The second event may likewise be passed to the first processor 1 in which the first processor 1 may calculate the outcome.

For example, in a game of cards, the first processor 1 selects a number between one and fifty-two, such as three. The second processor 2 assigns card values to every number between one and fifty-two, for example, the number one representing the jack of spades, the number two representing the seven of diamonds, and the number three representing the queen of hearts. When the number generated by the first processor 1 is received, it provides a pointer to a value generated by the second processor 2 and an outcome is obtained. In this example, the outcome is the queen of hearts. In other embodiments, two random events are combined to form a final event, such as in a game involving dice. In this example, the first event is the roll of the first die while the second event is the roll of the second die. The combined value of the first and second event provides the outcome. In this example, the second processor 2 performs the addition of the first event and the second event where in the previous example the second processor 2 performed an association. Various other implementations involving combinations of various multi-part events may be constructed. The examples should in no way be seen as limiting.

As shown in FIG. 1, non-volatile storage media 6, 7 is situated at each location and coupled to the respective processor 1, 2. The storage medium provides a location to store an event log of the events produced by a processor. For example, the first processor 1 creates an event log of all first events generated by the first random event generator 3 of the first processor 1. This event log is then stored in the storage medium 6. The event log contains such identification data as a time stamp indicating the time that the local processor generated an event, a digital signature of the local processor, as well as, the actual event that was generated. A second log is generated by either the first, the second or a third processor which calculates outcomes. For example, the processor first generates an outcome and then adds the outcome to an outcome log along with a time-stamp and a digital signature. This outcome log is then used to verify an outcome by comparing the data within the log to the logs from the processors that were used to generate a part used in determining the outcome. If a win occurs, a host audit server in communication with the processors requests the outcome log along with the logs from each of the processors which contributed events to determining the outcome. The audit server first verifies the digital signature of the logs and then recreates the outcome based on the event logs and compares the result to the outcome from the outcome log. If the recreated outcome and the outcome from the outcome log are identical, the audit server sends a signal to the processor of the gaming machine that had the win indicating that payment should be granted. Additionally, if no audit server is present within the system, verification might be a manual process where a verifying authority would access each processor and use the log of each processor to verify an outcome.

The processors are located in personal computers, servers, or in payout gaming machines such as a spinning reel machine or a video gaming machine or other specialized gaming hardware. The payout gaming machine has an input for selecting an outcome prediction and an input for selecting an amount to wager. The first processor and the second processor are each located within a separate housing. The system includes an independent communication server having a processor which produces one part of the multi-part event connected to a gaming machine which also contains a processor and produces another part of the multiple part event. The system further includes host audit and control servers for validating outcomes. The payout gaming machine containing one processor is located in a gaming parlor and a second processor is located at a second location that is remote from the gaming parlor and under the authority of a separate entity from the operators of the gaming parlor.

In a preferred embodiment of the invention, each random event is completely independent and calculated on a separate processor which makes tampering difficult. In one embodiment of the invention, the processors continuously generate random events and outcomes in which an outcome is only used when an outside source such as a player requests an outcome. When the player requests an outcome, whatever first and second events are generated at that time will produce an outcome. In an alternative embodiment, the processors generate events only when a player requests an outcome rather than continuously. In another embodiment, the random event generators generates events at periodic times.

Encryption of the generated events are used to further secure the system. Both public key and private key encryption are well known within the computer arts. Each processor within the system is so equipped as to have either access to an encryption program or a chip specifically designed for encryption. The generated events are encrypted by the related processor in which the encrypted event could only be decrypted with an appropriate key. For example, the first processor 1 encrypts the first event and sends the encrypted first event to the second processor 2. The second processor 2 generates a second event using its associated random event generator 4 and the processor 2 also decrypts the encrypted first event using the decryption key of the first processor. The first processor 1 is also equipped with the key for the decryption of the second event. Once decrypted, the first event and the second event are used to form an outcome.

Figure 2:
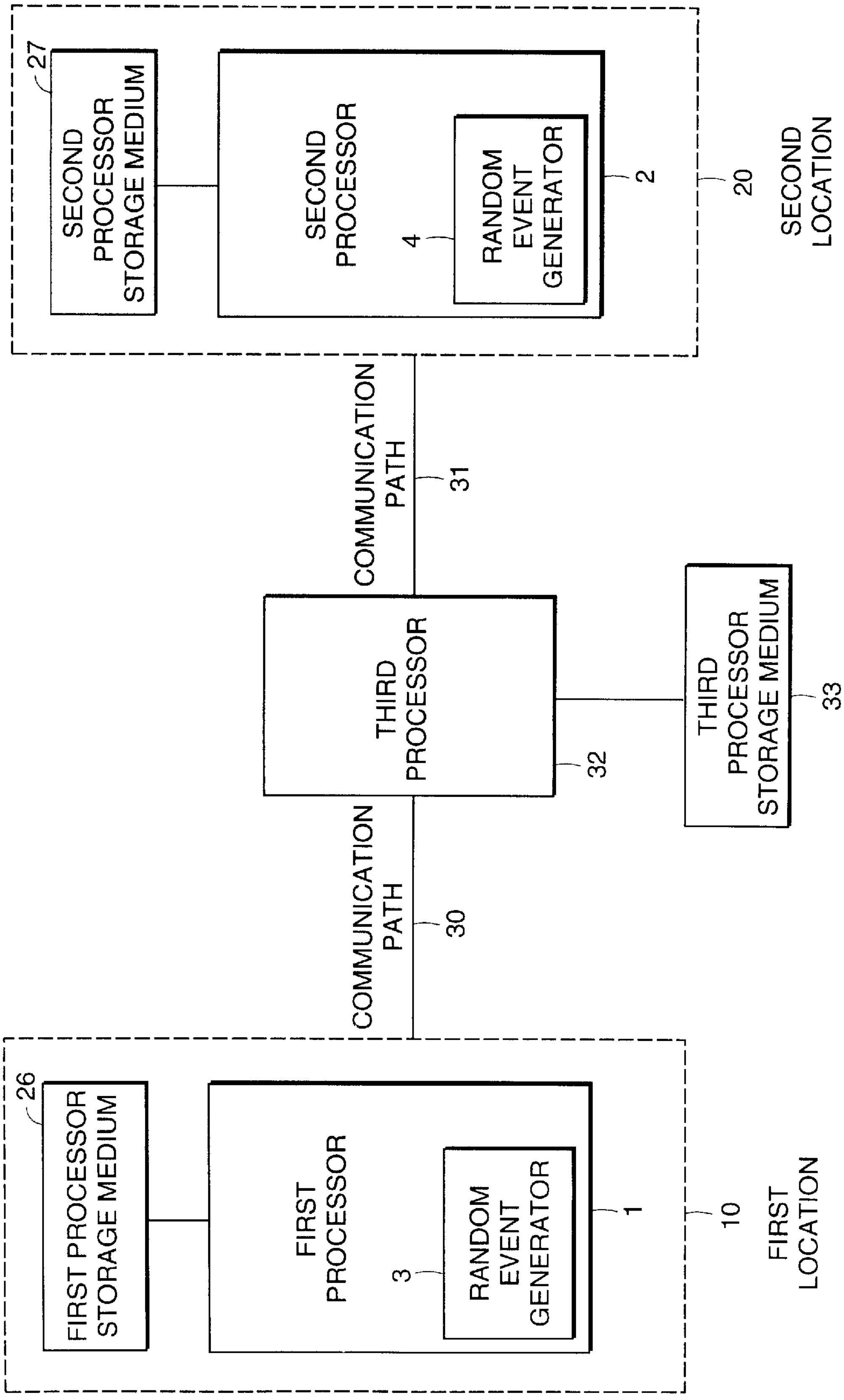
FIG. 2 is block diagram of an apparatus for determining a secure outcome in accordance with an alternative embodiment of the invention having three processors.

FIG. 2 shows an alternative embodiment of the invention for securely producing an outcome from multiple random events. In this embodiment, a third processor 32 is used. The third processor 32 provides a link between the first and second processors. As the first processor 1 generates a first event, the first event is passed via a communications path 30 to the third processor 32. Similarly, the second processor 2 generates a second event and the second event is passed to the third processor 32 via another communication path 31. In this embodiment, there is no direct communication paths between the first processor 1 and the second processor 2.

The third processor 32 can perform multiple functions. The third processor has a storage medium 33 associated with it and upon receipt of the first and second events creates a log of both events. The log contains the first event and the second event, as well as, a time stamp and digital signature of the third processor for confirmation purposes. This log is used for auditing and validation of outcomes. The third processor also passes the first and second events to the first processor and the first processor determines an outcome. In a gaming situation, if a player wins based on an outcome produced at the first processor 1, the first processor 1 requests a confirmation from the third processor 32 via the communications path 30. The third processor 32 then requests from the storage medium 33 the file containing the information that produced the outcome that caused the win. The third processor 32 validates the outcome based on the log information and attempts to produce an identical outcome based on the first and second events from the log. If the outcomes are identical the third processor signals that the win is valid and a payoff is granted.

A storage medium 26 is also associated with the first processor 1 and a storage medium 27 is associated with the second processor 2 in this embodiment. These storage media 26,27 are used for storing log information created by their respective processors regarding events that have been generated. These logs provide an additional security check for confirmation of data.

The third processor 32 is also used as a delay mechanism to increase security in the following manner. Once the first event is calculated and sent to the third processor 32, the third processor 32 holds the first event until the second event is received before passing the respective events to other processors for calculation of an outcome. In this way, both events must be received by the third processor 32 prior to an outcome being determined on either the first 1 or second processor 2. Since the first processor 1 has generated the first event prior to the third processor 32 passing the second event to the first processor 1, the outcome calculated on the first processor 1 can not be influenced based on knowledge of the second event. And since the events are logged by the third processor 32 neither the first nor the second processor 1,2 can change their respective events without a detectable discrepancy in the logs. If a processor is tampered with and a win occurs, the validation procedures would indicate that the at least one of the random event generators contributing to the outcome was compromised. Each log containing an event which contributed to the outcome is then recalled and the outcome is recreated based on the entries in the logs. If the recreated outcome and the winning outcome are not identical, then payoff is not granted and a signal is sent to the auditor or validation system server.

Encryption is also applied to this embodiment. Encryption is done to the first event by the first processor 1 and the second event by the second processor 2 where the decryption key is maintained at the first processor 1 for the second event and the decryption key for the first event is maintained at the second processor 2. Here, the third processor 32 receives the encrypted first event and the encrypted second event, but the third processor does not have a key for decrypting either event. In this embodiment, the encrypted events are passed into a log that is created by the third processor 32 which contains the encrypted event data. The log is then stored in the storage medium 33 which is associated with the third processor 32. The log is then used for validation purposes where the first event is sent to the second processor for decryption and the second event is sent to the first processor for decryption. The events are then passed to the third processor which forms an outcome for comparison to the winning outcome.

In another embodiment, where the third processor 32 does not have a storage medium associated with it, the third processor 32 combines the first and the second events into a single combined event and encrypts the combined event forming an encrypted combined event which needs a key that is known only to the third processor 32. The third processor also sends a copy of the encrypted first event to the second processor and a copy of the encrypted second event to the first processor. This allows either the first processor or the second processor to determine an outcome, since the first processor has the decryption key for the second event and the second processor has the decryption key for the first event.

The third processor also transfers the encrypted combined event to the first and second processors 1,2 where the encrypted combined event is stored in the respective storage medium for later confirmation purposes. Since neither the first nor the second processor 1,2 is capable of decrypting the encrypted combined event nor can the first or second processor 1,2 recreate the encrypted combined event, tampering with the first event, the second event, or the outcome would be futile.

When a player wins, in this embodiment, the processor calculating the outcome requests a confirmation and sends the encrypted combined event from the storage medium holding the combined encrypted event log along with the outcome producing the win to the third processor 32. The encrypted combined event is decrypted by the third processor 32 which has the key to decrypt the encrypted combined event and a new outcome is calculated based on the first and second events. The new outcome is then compared to the outcome producing the win to see if the outcomes are identical. Again, validation of an outcome may occur manually.

Figure 3:
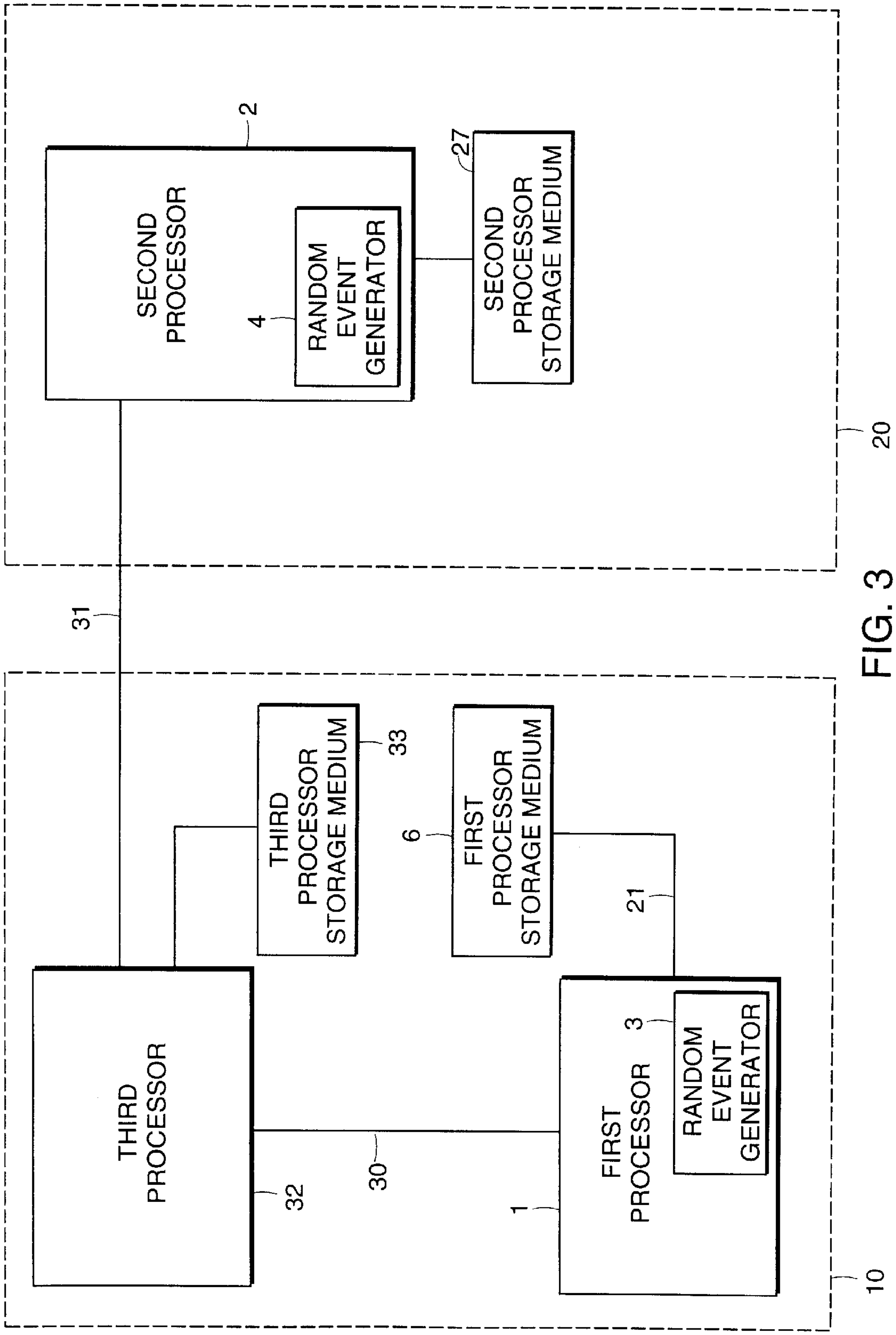
FIG. 3 is a flow chart of the steps which occur in an embodiment of the invention for determining a secure outcome.

In FIG. 3, a flow chart of another embodiment of the invention for secure determination of an outcome is shown. The first processor using its random event generator generates a first event (step 300). Likewise the second processor generates a second event (step 302). The first event is encrypted by the first processor (step 304) and then passed to the third processor (step 308) and the second event is encrypted by the second processor (step 306) and passed to the third processor (step 308). The first processor logs the first encrypted event to a storage medium (step 310) and the second processor also logs the second encrypted event to a storage medium (step 312). After receiving both the encrypted first and second events, the third processor passes the first encrypted event to the second processor (step 320) and the second encrypted event to the first processor (step 318). The third processor also takes the first and second encrypted events and encrypts the combination where the third processor is the only processor which holds the decryption key for the encrypted combination (step 314). This combination is stored in any storage medium, since it requires the decryption key from the third processor and the decryption keys from the first and second processors (step 316) which provides adequate security from tampering. The encrypted first and second events and the combination encrypted event are all stored on the storage medium associated with the third processor without a reduction in security. The second processor is provided with the decryption key for the first encrypted event and likewise the first processor is equipped with the decryption key of the second encrypted event. The first processor decrypts the second event (step 322) and the second processor decrypts the first event (step 324). The first processor then takes the first event and the second event and creates an outcome (step 326). Similarly, the second processor combines the first and the second events into an outcome (step 328). The outcome of the first event is logged in a storage medium as is the outcome from the second processor (steps 330,332).

Figure 4:
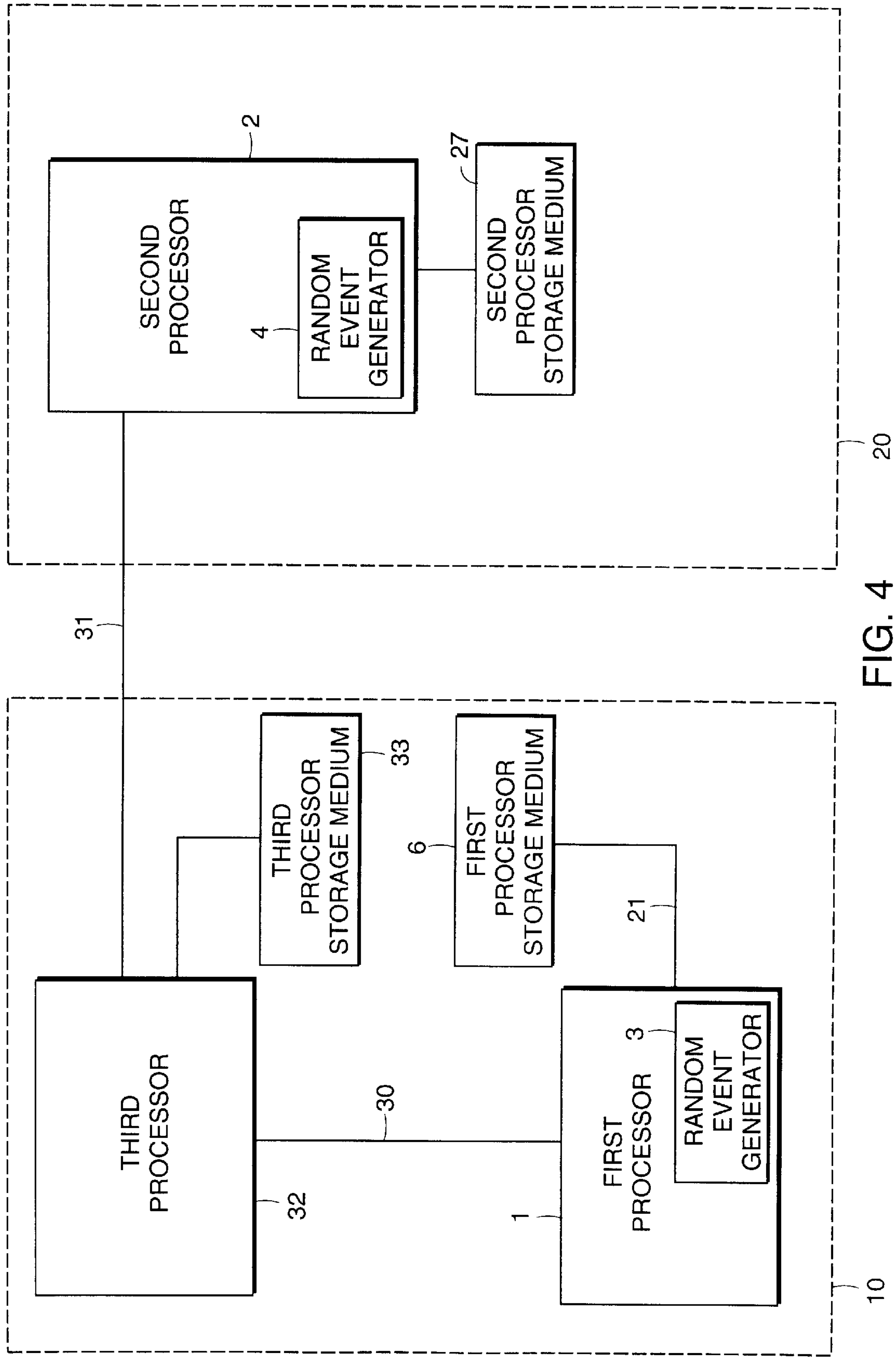
FIG. 4 is block diagram of the apparatus in accordance with another alternative embodiment of the invention.

In a further embodiment of the invention, the third processor 32 is placed in the first location 10 as shown in FIG. 4. It should be clear that the third processor 32 is placed in the first location 10 or in the second location 20 or in any other location independent of the first and the second locations. If the third processor 32 is located in the first location, there remains an independent communication path 30 between the first processor 1 and the third processor 32 and a second communication path 31 between the third processor 32 and the second processor 2.

An auditing and validation server is a component of an embodiment of the invention. The auditing and validation server at various intervals checks the outcome produced by a processor through a comparison to the logs associated with the events used in determining the outcome and the server also validates the outcome whenever a win occurs. In a situation where the third processor stored a log within its associated storage medium of all of the encrypted events, the auditing and validation server requests the log of the third processor and then sends the encrypted events to the processors that had the correct decryption keys. Upon decrypting all of the events the server gathers all of the events used in creating the outcome and recreates the outcome. This recreated outcome is then compared to the actual outcome as stored in the outcome log or as provided from a processor indicating a win. If the outcomes match and the server is performing a random or timed check, nothing further need be done, but if the outcome match and a win has been indicated the auditing and validation server signals the processor having the win and indicates that a payoff is authorized. If the outcomes do not match, an alarm occurs indicating that payoff should not be made and that at least one of the random event generators has been compromised.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. An apparatus which securely generates a random outcome comprising:

a first processor having a random event generator for generating a first event of a multiple-part event, wherein the first processor creates a log of all first events generated and stores the log in a first processor storage medium; and a second processor having a random event generator for generating a second event of the multiple-part event, wherein the second processor creates a log of all second events generated and stores the log in a second processor storage medium;

wherein the first processor sends the generated first event to the second processor and the second processor uses the first event and the second event to form an outcome.

2. An apparatus according to claim 1, further comprising: a communications path coupling the first processor to the second processor.

3. An apparatus according to claim 2, wherein the first processor is located inside a first housing and wherein the second processor is located inside a second housing.

4. An apparatus according to claim 1, wherein the first random event generator and the second random event generator generate first events and second events, respectively, at periodic times.

5. An apparatus according to claim 1, wherein the first random event generator and the second random event generator generate first events and second events, respectively, at random time periods.

6. An apparatus according to claim 1, wherein the first and second random event generators attach identification data to the first event and the second event, respectively.

7. An apparatus according to claim 6, wherein the identification data includes time of generation of the event and a digital signature of the processor generating the event.

8. An apparatus according to claim 1, wherein the first processor has means for encrypting the first event before sending the first event to the second processor, the second processor having a key for decrypting the first event.

9. An apparatus which securely generates a random outcome, the apparatus comprising:

a first processor having a random event generator for generating a first event of a multiple-part event, wherein the first processor encrypts the first event needing a first decryption key for decryption;

a second processor having a random event generator for generating a second event of the multiple-part event, wherein the second processor encrypts the second event needing a second decryption key for decryption; and a third processor;

wherein the third processor has the first key and the second key, receives the first event from the first processor and the second event from the second processor, and decrypts the first event and the second event prior to using the first and second events to form an outcome.

10. The apparatus according to claim 9, further comprising:

a communications path coupling the first processor to the third processor; and a second communications path coupling the third processor to the second processor.

11. The apparatus according to claim 9, wherein the first processor is located within a first housing and the second processor is located within a second housing.

12. The apparatus according to claim 11, wherein the third processor is not located in the first housing and not located in the second housing.

13. The apparatus of claim 9, wherein the first processor is not in direct communication with the second processor.

14. The apparatus according to claim 9, wherein the third processor determines the outcome from the first and the second events.

15. An apparatus which securely generates a random outcome, the apparatus comprising:

a first processor having a random event generator for generating a first event of a multiple-part event;

a second processor having a random event generator for generating a second event of the multiple-part first event; and a third processor;

wherein the third processor receives the first event from the first processor and the second event from the second processor and an outcome is determined by the first and second events, wherein the third processor creates a log of received first and second events and stores the log in a third processor storage medium.

16. An apparatus which securely generates a random outcome, the apparatus comprising:

a first processor having a random event generator for generating a first event of a multiple-part event;

a second processor having a random event generator for generating a second event of the multiple-part event; and a third processor;

wherein the third processor receives the first event from the first processor and the second event from the second processor and an outcome is determined by the first and second events, wherein the third processor passes the second event to the first processor, the first processor using the first and second events to form an outcome.

17. An apparatus according to claim 16, wherein the first processor creates a log of all first events generated and stores the log in a first processor storage medium, the second processor creating a log of all second events generated and storing the log in a second processor storage medium.

18. An apparatus according to claim 17, wherein the second processor has means for encrypting the second event needing a second decryption key for decryption, the first processor having the second decryption key and means for decrypting the second event before using the first event and the second event to form a first outcome.

19. An apparatus according to claim 18, wherein the first processor has means for encrypting the first event needing a first decryption key for decryption, the third processor passing the first event needing a first decryption key to the second processor and the second processor having the first decryption key and means for decrypting the first event where the second processor uses the first event and the second event to form a second outcome.

20. An apparatus according to claim 19, wherein the third processor combines the encrypted first event with the encrypted second event forming a combination event and encrypts the combination event needing a third key for decryption forming an encrypted combination event and sends the encrypted combination event to the first processor which stores the information in the first processor storage medium.

21. A method for securely generating a random outcome, the method comprising the steps of:

generating the first event of a multiple-part event in a first processor having a random event generator;

generating the second event of the multiple-part event in a second processor having a random event generator;

sending the generated first event to the second processor;

using the first event and the second event to form an outcome;

creating a log of all first events generated by the first processor storing the log in a first associated storage medium;

creating a log of all second events generated by the second processor; and storing the log in a second associated storage medium.

22. The method according to claim 21, wherein the steps of generating the first event and generating the second event occur at periodic intervals.

23. The method according to claim 21, wherein the steps of generating the first event and generating the second event occur at random intervals.

24. A method according to claim 21, further comprising the steps of:

attaching identification data to the first event; and attaching identification data to the second event.

25. A method according to claim 24, wherein in the step of attaching identification data to the first event, the identification data includes the time of creation and a digital signature of the first processor, and in the step of attaching identification data to the second event, the identification data includes the time of creation and a digital signature of the second processor.

26. A method according to claim 21, further comprising the steps of: encrypting the first event before sending the first event to the second processor, the second processor has the key for decrypting the first event.

27. A method for securely generating a random outcome, the method comprising the steps of:

generating a first event of a multiple-part event in a first processor having a random event generator;

generating a second event of the multiple-part event in a second processor having a random event generator;

receiving the first event from the first processor and the second event from the second into a third processor;

determining an outcome based on the first event and second event;

encrypting the first event needing a first decryption key for decryption;

encrypting the second event needing a second decryption key for decryption;

decrypting the first event in the third processor using the first decryption key;

decrypting the second event in the third processor using the second decryption key;

creating a log of received events by the third processor;

storing the log of received events in a processor storage medium; and passing the second event from the third processor to the first processor;

wherein the first processor determines the outcome based upon the first and second events.

28. A method according to claim 27, further comprising the steps of:

creating a first log of all first events generated by the first processor;

storing the first log in a first processor storage medium;

creating a second log of all second events generated by the second processor; and storing the second log in a second associated storage medium.

29. A method according to claim 27, further comprising the steps of:

encrypting the second event with the second processor needing a second decryption key for decryption; and decrypting the second event in the first processor by using the second decryption key.

30. A method according to claim 27, further comprising the steps of:

encrypting the first event in the first processor requiring a first key for decryption;

encrypting the second event in the second processor requiring a second key for decryption;

combining the encrypted first event with the encrypted second event forming a combination event;

encrypting the combination event needing a third key for decryption forming an encrypted combination event;

sending the encrypted combination event to the first processor; and storing the encrypted combination event in a first processor storage medium.

* * * * *